(12) United States Patent
Garcia

(10) Patent No.: US 9,030,043 B2
(45) Date of Patent: May 12, 2015

(54) METHOD FOR SETTING AN OUTPUT VOLTAGE LEVEL OF A WIND POWER PLANT

(75) Inventor: Jorge Martinez Garcia, Risskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 598 days.

(21) Appl. No.: 12/934,936

(22) PCT Filed: Jan. 29, 2010

(86) PCT No.: PCT/EP2010/051103
§ 371 (c)(1),
(2), (4) Date: Dec. 13, 2010

(87) PCT Pub. No.: WO2010/086415
PCT Pub. Date: Aug. 5, 2010

(65) Prior Publication Data
US 2011/0184572 A1    Jul. 28, 2011

Related U.S. Application Data

(60) Provisional application No. 61/148,114, filed on Jan. 29, 2009.

(30) Foreign Application Priority Data

Jan. 29, 2009   (DK) .................................. 2009 00134

(51) Int. Cl.
*H02J 1/00* (2006.01)
*F03D 9/00* (2006.01)

(52) U.S. Cl.
CPC *F03D 9/005* (2013.01); *Y02E 10/72* (2013.01)

(58) Field of Classification Search
CPC .............. H02J 1/10; H02J 1/102; H02J 7/35; Y02E 60/12; G06F 1/26
USPC ................ 323/205, 209, 210; 290/44, 55, 40; 307/45, 65, 69, 84, 30, 153; 700/286, 700/287, 292, 293, 298; 702/60, 65; 318/767, 763; 363/120; 320/137
See application file for complete search history.

(56) References Cited

U.S. PATENT DOCUMENTS 4,326,236 A * 4/1982 McNair et al. ................ 361/170
7,256,566 B2 * 8/2007 Bhavaraju et al. ............ 320/101
(Continued)

FOREIGN PATENT DOCUMENTS

| DE | 102005052010 | 10/2007 |
|---|---|---|
| EP | 1512869 | 3/2005 |
| EP | 1519040 | 3/2005 |
| EP | 1841037 | 10/2007 |

(Continued)

OTHER PUBLICATIONS

G. Brauner, Netzanbind von Windkraftanlagen, Springer Verlag, Wien, vol. 116. No. 7/08 (1999).
International Search Report dated Jun. 4, 2010.

*Primary Examiner* — Rexford Barnie
*Assistant Examiner* — Jagdeep Dhillon
(74) *Attorney, Agent, or Firm* — Patterson + Sheridan LLP

(57) ABSTRACT

The present invention addresses the problem of avoiding that wind turbine voltage levels within a wind power plant do not exceed predetermined overvoltage and/or undervoltage protection levels. In particular, the present invention relates to shifting of an output voltage level of a wind power plant in order to protect an internal power plant grid against overvoltages.

12 Claims, 2 Drawing Sheets

(56) References Cited

U.S. PATENT DOCUMENTS 7,346,462 B2 * 3/2008 Delmerico .................. 702/60
8,041,465 B2 * 10/2011 Larsen et al. ............... 700/287
8,234,015 B2 * 7/2012 Bech et al. .................. 700/292

FOREIGN PATENT DOCUMENTS

| WO | WO 2004/025803 | 3/2004 |
| WO | WO 2008/125163 | 10/2008 |

* cited by examiner

METHOD FOR SETTING AN OUTPUT VOLTAGE LEVEL OF A WIND POWER PLANT

FIELD OF THE INVENTION

The present invention relates to a method for ensuring that wind turbine voltage levels within a wind power plant do not exceed a predetermined security level.

BACKGROUND OF THE INVENTION

Internal power grids of wind power plants connect individual wind turbines of a wind power plant to a point of common coupling—the latter being the point where power is fed onto a power supply grid from the wind power plant.

In order to do this correctly the impedance of the internal power grid between each of the wind turbines of the plant and the point of common coupling has to be taken into consideration.

As illustrated in FIG. 1, and explained in more details later, the wind turbine experiencing the highest impedance to the point of common coupling needs to generate the highest wind turbine voltage level in order to compensate for voltage drops in the internal power grid. However, by following this approach the highest wind turbine voltage level within the plant may become dangerously close to, or even exceed, an upper voltage level with the risk of damaging the internal grid. Moreover, a long time exposure to a voltage level being lower than the nominal voltage level could result in damages to the equipment. This is due to higher currents in order to keep the power level constant.

The voltage profiles of wind turbines connected to the internal power grid depend on the impedance values and the apparent power flowing through the internal power grid.

It may be seen as an object of embodiments of the invention to provide a method that ensures that a predetermined voltage level within the wind power plant is not exceeded.

It may be seen as a further object of embodiments of the present invention to provide a method that ensures that an overvoltage level and/or an undervoltage level within the wind turbine plant is not exceeded.

DESCRIPTION OF THE INVENTION

It has been found by the present inventor(s) that by implementing embodiments of the present invention internal power grids of wind power plants can be effectively protected.

So, in a first aspect the present invention relates to a method for setting an output voltage level of a wind power plant comprising a plurality of wind turbines being operatively connected to a plant power grid, the wind turbines being adapted to supply individual wind turbine voltage levels to the plant power grid in order to compensate for grid impedances, the method comprising the steps of determining a first wind turbine voltage level among a number of wind turbines, and setting the output voltage level of the wind power plant in accordance therewith.

It is an advantage of embodiments of the present invention that voltage levels of internal power grids of wind power plants can maintain sufficient margins to overvoltage and/or undervoltage protection levels. By following the idea underlying the present invention damage to internal power plant grids due to overvoltage levels can be avoided.

In order to determined the highest available voltage level within a wind power plant the wind turbine voltage level of each wind turbine of the plant may be determined. This may be accomplished either by measurements or by calculations. By following this approach the lowest available voltage level is also determined.

The wind power plant output voltage level may be set to differ from a voltage level of a point of common coupling by an amount being smaller than or equal to a difference between the highest wind turbine voltage level and the voltage level of a point of common coupling. The point of common coupling is the point where the wind power plant feeds power into an external power supply grid to which consumers are connected.

In one embodiment of the present invention the wind power plant output voltage level is set to differ from the voltage level of the point of common coupling by an amount being equal to approximately half of the difference between the highest wind turbine voltage level and the voltage level of a point of common coupling.

As an example, the wind power plant may feed electrical energy into a 110 kV power supply grid. Thus, the voltage at a point of common coupling (PCC), Vpcc, equals 110 kV. The wind power plant voltage, Vpp, may for example be in the order of around 30 kV. Thus, a power transformer is needed in order to match Vpp with Vpcc.

However, it should be noted that since Vpcc is fixed and since a power transformer has a non negligible intrinsic impedance that varies with the amount of power injected into the power supply grid, the power plant voltage, Vpp, needs to be varied with the amount of power injected into the power supply grid. Thus, power plant voltage, Vpp, will be shifted upwards and downwards depending on the amount of power injected into the power supply grid.

According to the present invention the level of Vpp may be shifted in order to avoid that individual wind turbine voltage levels within the wind power plant exceed predetermined overvoltage and/or undervoltage protection levels. Since Vpcc should be kept constant at a given level (for example 110 kV) the transformer ratio should be variable. One way of implementing a variable transformer ratio is to use a transformer comprising a tap changer for changing the transformer ratio for adjustments between Vpp and Vpcc.

In another embodiment of the present invention the highest and lowest available voltage levels from wind turbines of the plant may be used to calculate the wind power plant output voltage. For example, the wind power plant output voltage may be lowered relative to the power supply grid voltage by an amount being equal to half of the difference between the highest and lowest available voltage levels.

In yet another embodiment weighting factors may be applied by multiplication to each of the wind turbine voltages in order to calculate the new voltage set point for the voltage level at the point of common coupling.

The wind power plant output voltage level may be set to be lower than the voltage level of the point of common coupling. To comply with this the wind turbine voltage level of each wind turbine is lowered accordingly. In order to match the power supply grid voltage at the point of common coupling appropriate means for converting the wind power plant output voltage level to a voltage level that matches a voltage level of a point of common coupling may be provided. Such means for converting the wind power plant output voltage level to a voltage level that matches the voltage level of a point of common coupling may comprise a transformer optionally with a variable ratio between primary and secondary windings. A variable ratio between primary and secondary windings facilitates that the wind power plant output voltage may be shifted if demands so require.

In a second aspect, the present invention relates to a method for setting a common output voltage level of a group of wind turbines comprising a plurality of wind turbines being operatively connected to a local power grid, the wind turbines being adapted to supply individual wind turbine voltage levels to the local power grid in order to compensate for local grid impedances, the method comprising the steps of determining a first wind turbine voltage level among a number of wind turbines, and setting the common output voltage level of the group of wind turbines in accordance therewith.

The wind turbine voltage level of each wind turbine may be determined so as to determine the highest wind turbine voltage level among the available wind turbine voltage levels.

In the second aspect of the present invention the group of wind turbines may form part of a wind power plant. Similar to the first aspect of the present invention the common output voltage level of the group of wind turbines may be changed, such as lowered, when the highest wind turbine voltage level exceeds a predetermined level. This predetermined level may be defined as a percentage of an overvoltage or undervoltage protection level.

In terms of implementation the method according to the second aspect may be implemented following the same design route as discussed in connection with the first aspect of the present invention.

In a third aspect the present invention relates to a wind power plant comprising control means for setting an output voltage level of wind power plant, the wind power plant comprising a plurality of wind turbines being operatively connected to a plant power grid, the wind turbines being adapted to supply individual wind turbine voltage levels to the plant power grid in order to compensate for grid impedances, the control means comprising means for determining the highest wind turbine voltage level among a number of wind turbines, and means for setting the output voltage level of the wind power plant in accordance therewith.

The means for setting the output voltage level of the wind power plant may comprise means for setting and providing voltage control signals to each of the plurality of wind turbines forming the wind power plant, wherein each of said voltage control signals is a representative of a wind turbine voltage level to be generated by a given wind turbine.

In a fourth aspect the present invention relates to a control arrangement for setting a common output voltage level of a group of wind turbines comprising a plurality of wind turbines being operatively connected to a local power grid, the wind turbines being adapted to supply individual wind turbine voltage levels to the local power grid in order to compensate for local grid impedances, the arrangement comprising means for determining the highest wind turbine voltage level among a number of wind turbines, and means for setting the common output voltage level of the group of wind turbines in accordance therewith.

Again, the means for setting the output voltage level of the group of wind turbines may comprise means for setting and providing voltage control signals to each of the plurality of wind turbines forming the group of wind turbines, wherein each of said voltage control signals is a representative of a wind turbine voltage level to be generated by a given wind turbine.

BRIEF DESCRIPTION OF THE DRAWINGS

The present invention will now be explained in further details with reference to the accompanying figures, wherein.

Figure 1:
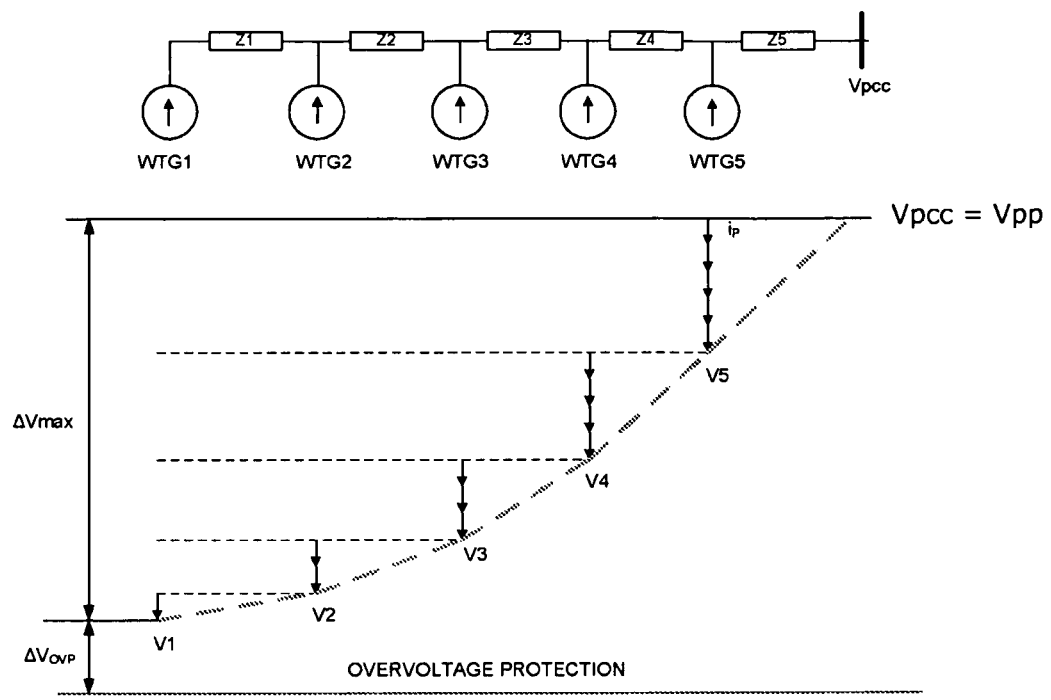
FIG. 1 shows a prior art method.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The principle underlying the present invention is applicable to entire wind power plants as well as sub-groups of wind turbines within a wind power plant.

FIG. 1 illustrates a known method for compensating for impedances in an internal power plant grid. As depicted in FIG. 1 five wind turbines generators, WTG1-WTG5, are operatively connected to an internal power plant grid. The power plant grid is connected to an external power supply grid (not shown) at a point of common coupling PCC. At this point of common coupling the voltage level of the plant should match the voltage level of the power supply grid. This voltage is denoted Vpcc.

In order to compensate for grid impedances Z1-Z5 the generated wind turbine voltages V1-V5 from the respective ones of WTG1-WTG5 will typically be as illustrated in FIG. 1 where WTG5 generates the lowest voltage and WTG1 generates the highest voltage, the difference between the latter and the voltage level at the PCC, Vpcc, being denoted $\Delta Vmax$ in FIG. 1.

To protect the internal power plant grid against overvoltages a margin of $\Delta V_{OVP}$ is added to $\Delta Vmax$. Thus, if the power plant grid voltage reaches a level of $\Delta Vmax + \Delta V_{OVP}$ above Vpcc the internal power grid may be damaged. The same procedure could be applied for overvoltage protection in relation to damages to devices.

The present invention aims at avoiding that a maximum and/or minimum allowed voltage level within a wind power plant is reached, or even exceeded thus preventing damages to the equipment within the wind power plant.

Figure 2:
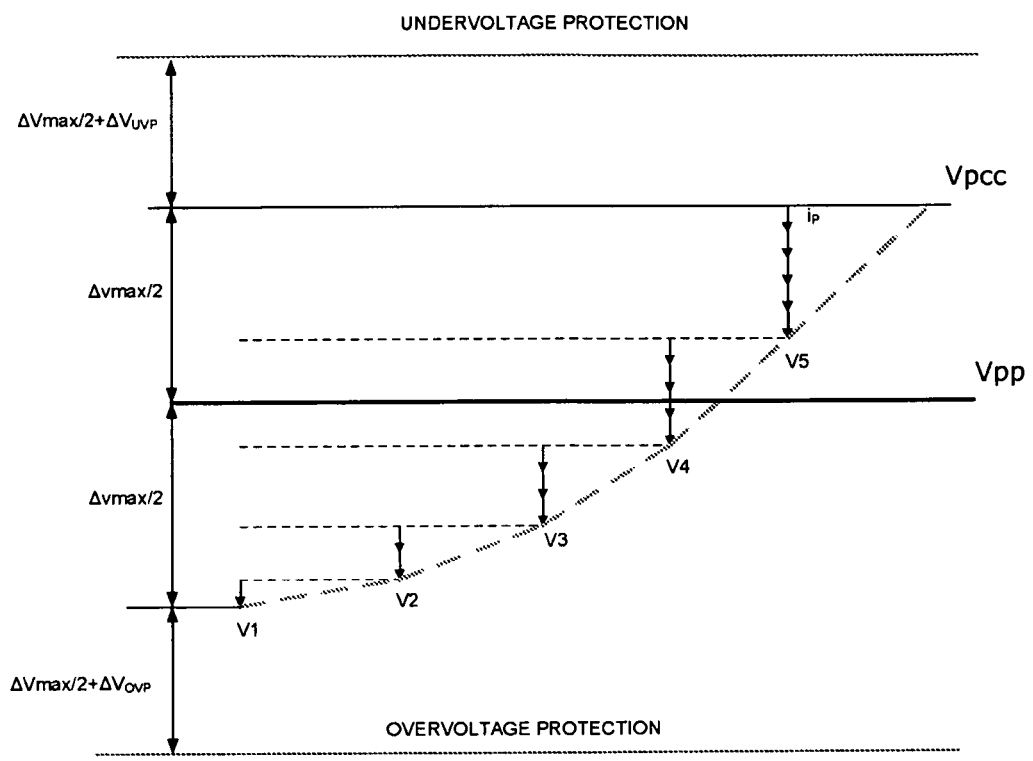
FIG. 2 shows an embodiment of the present invention.

An embodiment of the present invention is depicted in FIG. 2. As seen, the output voltage of the wind power plant, Vpp, has be lowered by $\Delta Vmax/2$ so that the difference between Vpcc and Vpp equals $\Delta Vmax/2$. However, it should be noted that the difference between Vpcc and Vpp may be chosen differently, i.e. chosen to be different from $\Delta Vmax/2$. By displacing Vpp by an amount of $\Delta Vmax/2$ an increased margin to the overvoltage protections levels is provided.

In the embodiment illustrated in FIG. 2 the margin to the overvoltage protection level has been increased by an amount of $\Delta Vmax/2$. On the other hand the margin to the undervoltage protection level has been reduced by an amount of $\Delta Vmax/2$. However, the margins to the voltage protection levels are more evenly distributed compared to known methods.

Various different schemes may be applied to shift Vpp. These various schemes may be of dynamic or static nature. In fact, the scheme may be of adaptive nature so as to adjust to dynamic variations of a power supply grid.

As an example, the wind turbine generators of the plant providing the highest and the lowest output voltages may be used to calculate a mean value that can be used as an input parameter to a control system. Alternatively, the output voltages of the wind turbine generators of the plant can be weighted by applying weight factors and multiply these factors with respective ones of the wind turbine voltages. The weight factors can be derived from the impedance between the point where Vpp is measured and each individual wind turbine generator. The impedance values can be based on actual measurements or on calculations based on cable and transformer impedances.

In order to connect properly to a power supply grid Vpp needs to be transformed to a voltage level matching Vpcc. To achieve this, a suitable transformer can be applied. Often the transformer has a tap changer which can be used to change the transformer ratio for adjustments between Vpp and Vpcc. Depending on site specific parameters the range of which the transformer ratio can be adjusted may vary.

In summary the present invention relates to an idea that addresses the problem of avoiding that wind turbine voltage levels within a wind power plant exceed predetermined overvoltage and/or undervoltage protection levels. In particular, the present invention relates to shifting of an output voltage level of a wind power plant in order to protect an internal power plant grid against overvoltages.

In terms of real numbers the following voltage levels may be applicable:

Vpp=30 kV=1 p.u.
$\Delta V_{max}$=1.1 p.u.
$\Delta V_{OVP}$=1.12 p.u.
Vpcc=110 kV.

Obviously a power transformer is required to match Vpp with Vpcc. Since Vpp is variable and Vpcc should be kept constant at 110 kV the transformer ratio should be variable. As previously mentioned, one way of implementing a variable transformer ratio is to use a transformer comprising a tap changer for changing the transformer ratio for adjustments between Vpp and Vpcc. It should be noted that the above-mentioned voltage levels only serve as an example, and they may, obviously, be chosen differently.

Any range or device value given herein may be extended or altered without loosing the effect sought as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for setting an output voltage level of a wind power plant comprising a plurality of wind turbines operatively connected to a plant power grid, each wind turbine configured to generate a respective wind turbine voltage level to compensate for grid impedances, the method comprising:
as between at least two of the plurality of wind turbines, determining a largest generated wind turbine voltage level, wherein determining the largest generated wind turbine voltage level comprises determining the wind turbine voltage level of each of the plurality of wind turbines; and
based on a value of the largest generated wind turbine voltage level, setting the output voltage level of the wind power plant,
wherein the output voltage level of the wind power plant is set to differ from the voltage level at a point of common coupling by an amount approximately half of the difference between the largest generated wind turbine voltage level and the voltage level at the point of common coupling, and
wherein the output voltage level of the wind power plant is set to be less than the voltage level at the point of common coupling.

2. The method of claim 1, wherein a mean voltage level is determined from the largest generated wind turbine voltage level and a smallest generated wind turbine voltage level of the at least two wind turbines, and wherein the output voltage level of the wind power plant is set based on the mean voltage level.

3. The method of claim 1, wherein weighting factors are applied to each of the determined wind turbine voltage levels, and wherein the output voltage level of the wind power plant is set based on the weighted wind turbine voltage levels.

4. The method of claim 1, further comprising converting the output voltage level of the wind power plant to match the voltage level at the point of common coupling.

5. The method of claim 4, wherein converting the output voltage level of the wind power plant to match the voltage level at the point of common coupling is accomplished by a transformer with a variable ratio between primary and secondary windings.

6. A method for setting a common output voltage level of a plurality of wind turbines operatively connected to a local power grid, each wind turbine configured to generate a respective wind turbine voltage level to compensate for local grid impedances, the method comprising:
as between at least two of the plurality of wind turbines, determining a largest generated wind turbine voltage level, wherein determining the largest generated wind turbine voltage level comprises determining the wind turbine voltage level of each of the plurality of wind turbines; and
based on a value of the largest generated wind turbine voltage level, setting the common output voltage level of the plurality of wind turbines,
wherein the output voltage level of the wind power plant is set to differ from the voltage level at a point of common coupling by an amount approximately half of the difference between the largest generated wind turbine voltage level and the voltage level at the point of common coupling, and
wherein the output voltage level of the wind power plant is set to be less than the voltage level at the point of common coupling.

7. The method of claim 6, wherein the plurality of wind turbines form part of a wind power plant.

8. The method of claim 6, wherein the common output voltage level of the plurality of wind turbines is configured to change when the largest generated wind turbine voltage level exceeds a predetermined level.

9. The method of claim 8, wherein the common output voltage level of the plurality of wind turbines is configured to decrease when the largest generated wind turbine voltage level exceeds the predetermined level.

10. The method of claim 8, wherein the predetermined level is defined as a percentage of one of an overvoltage and an undervoltage protection level.

11. A wind power plant, comprising:
a plurality of wind turbines operatively connected to a plant power grid, each wind turbine configured to supply a respective wind turbine voltage level to compensate for grid impedances;
a controller configured to set an output voltage level of the wind power plant by performing an operation, comprising:
as between at least two of the plurality of wind turbines, determining a largest generated wind turbine voltage level, wherein determining the largest generated wind turbine voltage level comprises determining the wind turbine voltage level of each of the plurality of wind turbines; and
based on a value of the largest generated wind turbine voltage level, setting the output voltage level of the wind power plant,
wherein the output voltage level of the wind power plant is set to differ from the voltage level at a point of common coupling by an amount approximately half of the difference between the largest generated wind turbine voltage level and the voltage level at the point of common coupling, and
wherein the output voltage level of the wind power plant is set to be less than the voltage level at the point of common coupling.

12. A control arrangement for setting a common output voltage level of a plurality of wind turbines operatively connected to a local power grid, each wind turbine configured to supply a respective wind turbine voltage level to compensate for local grid impedances, the control arrangement comprising:
means for determining, as between at least two of the plurality of wind turbines, a largest generated wind turbine voltage level, wherein determining the largest generated wind turbine voltage level comprises determining the wind turbine voltage level of each of the plurality of wind turbines; and
means for setting the common output voltage level of the plurality of wind turbines based on a value of the largest generated wind turbine voltage level,
wherein the output voltage level of the wind power plant is set to differ from the voltage level at a point of common coupling by an amount approximately half of the difference between the largest generated wind turbine voltage level and the voltage level at the point of common coupling, and
wherein the output voltage level of the wind power plant is set to be less than the voltage level at the point of common coupling.

* * * * *